(12) United States Patent
Lian et al.

(10) Patent No.: US 12,132,182 B2
(45) Date of Patent: Oct. 29, 2024

(54) BATTERY ENERGY PROCESSING DEVICE AND METHOD, AND VEHICLE

(71) Applicant: BYD COMPANY LIMITED, Guangdong (CN)

(72) Inventors: Yubo Lian, Shenzhen (CN); Heping Ling, Shenzhen (CN); Hua Pan, Shenzhen (CN); Lei Yan, Shenzhen (CN); Feiyue Xie, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 13 days.

(21) Appl. No.: 18/008,091

(22) PCT Filed: Jun. 4, 2021

(86) PCT No.: PCT/CN2021/098397
§ 371 (c)(1),
(2) Date: Dec. 2, 2022

(87) PCT Pub. No.: WO2021/244642
PCT Pub. Date: Dec. 9, 2021

(65) Prior Publication Data
US 2023/0238603 A1    Jul. 27, 2023

(30) Foreign Application Priority Data

Jun. 4, 2020 (CN) .......................... 202010502048.8

(51) Int. Cl.
*B60L 53/22* (2019.01)
*B60L 53/24* (2019.01)
(Continued)

(52) U.S. Cl.
CPC ........... *H01M 10/637* (2015.04); *B60L 53/24* (2019.02); *B60L 58/27* (2019.02); *H01M 10/44* (2013.01); *H02P 27/06* (2013.01)

(58) Field of Classification Search
CPC .. H01M 10/637; H01M 10/44; H01M 10/615; H01M 10/625; H01M 10/63;
(Continued)

(56) References Cited

U.S. PATENT DOCUMENTS

| 7,891,451 | B2 * | 2/2011 | Oyobe | ................... B60K 6/445 |
|           |      |        |       | 180/65.265 |
| 9,908,430 | B2 * | 3/2018 | Gorka | ..................... B60L 15/02 |

(Continued)

FOREIGN PATENT DOCUMENTS

| CN | 107394294 A | 11/2017 |
| CN | 108511822 A | 9/2018 |

(Continued)

OTHER PUBLICATIONS

International Search Report and Written Opinion for Application No. PCT/CN2021/098397, mailed on Sep. 14, 2021, 10 pages.

*Primary Examiner* — Elim Ortiz (57) ABSTRACT

The present disclosure relates to a battery energy processing device and method and a vehicle. The battery energy processing device includes: a bridge arm converter, having a first bus terminal connected with a positive electrode of a battery and a second bus terminal connected with a negative electrode of the battery; a motor winding, having a first end connected with a midpoint of the bridge arm converter; an energy storage device, respectively connected with a second end of the motor winding and the second bus terminal; and a controller, configured to control, in a first preset state, the bridge arm converter to charge and discharge the battery, so as to realize heating of the battery. In this way, the charging and discharging of the battery can be controlled, and internal resistance of the battery causes the battery to generate a large amount of heat, which causes a temperature rise of the battery, thereby realizing the heating of the battery.

20 Claims, 4 Drawing Sheets

(51) Int. Cl.
  *B60L 58/27* (2019.01)
  *H01M 10/44* (2006.01)
  *H01M 10/637* (2014.01)
  *H02P 27/06* (2006.01)

(58) Field of Classification Search
  CPC ...... H01M 10/667; B60L 53/24; B60L 58/27; B60L 2210/14; B60L 2210/30; B60L 2210/42; H02P 27/06; H02P 29/62; H02P 2209/01; Y02E 60/10; Y02T 10/70; Y02T 90/14
  USPC ........................................ 307/9.1, 45, 46, 56
  See application file for complete search history.

(56) References Cited

U.S. PATENT DOCUMENTS

| | | | | |
|---|---|---|---|---|
| 2009/0134700 | A1* | 5/2009 | Tanaka | B62D 5/046 307/10.6 |
| 2021/0061128 | A1* | 3/2021 | Lee | B60L 58/27 |
| 2023/0086550 | A1* | 3/2023 | Uchiyama | H01M 10/46 307/77 |

FOREIGN PATENT DOCUMENTS

| | | |
|---|---|---|
| CN | 108847513 A | 11/2018 |
| CN | 110116653 A | 8/2019 |
| CN | 110789400 A | 2/2020 |
| CN | 210225008 U | 3/2020 |
| CN | 110962631 A | 4/2020 |
| CN | 110962692 A | 4/2020 |
| CN | 110970690 A | 4/2020 |
| CN | 111098760 A | 5/2020 |
| CN | 111391718 A | 7/2020 |
| EP | 2634035 A1 | 9/2013 |
| EP | 3758132 A1 | 12/2020 |
| JP | 5050324 B2 | 10/2012 |
| JP | 2013187919 A | 9/2013 |
| JP | 2015233355 A | 12/2015 |

* cited by examiner

A bridge arm converter is controlled in a first preset state to charge and discharge a battery, so as to realize heating of the battery ~701

FIG. 11

BATTERY ENERGY PROCESSING DEVICE AND METHOD, AND VEHICLE

CROSS-REFERENCE TO RELATED APPLICATIONS

The application is a national phase application of International Patent Application No. PCT/CN2021/098397 filed with the China National Intellectual Property Administration (CNIPA) on Jun. 4, 2021, which is based on and claims priority to and benefits of Chinese Patent Application 202010502048.8, filed on Jun. 4, 2020 and entitled "BATTERY ENERGY PROCESSING DEVICE AND METHOD AND VEHICLE". The entire content of the above-referenced applications is incorporated herein by reference.

FIELD

The present disclosure relates to the technical field of batteries, and more specifically, to a battery energy processing device and method and a vehicle.

BACKGROUND

With the wide use of new energy, batteries can be used as power sources in various fields. Performance of a battery varies with different environment where the battery is used as a power source. For example, the performance of the battery in a low temperature environment is much lower than that in a normal temperature environment. For example, at a zero temperature, the discharge capacity of the battery decreases with the decrease of the temperature. At −30° C., the discharge capacity of the battery is substantially 0, resulting in a failure of the battery. In order to use the battery in the low temperature environment, the battery is required to be heated.

SUMMARY

The present disclosure aims to resolve at least one of the technical problems in the related art.

A first objective of the present disclosure is to provide a battery energy processing device.

A second objective of the present disclosure is to provide a battery energy processing method.

A third objective of the present disclosure is to provide a vehicle.

In order to achieve the above objectives, a first aspect of embodiments of the present disclosure provides a battery energy processing device. The battery energy processing device includes: a bridge arm converter, having a first bus terminal connected with a positive electrode of a battery and a second bus terminal connected with a negative electrode of the battery; a motor winding, having a first end connected with a midpoint of the bridge arm converter; an energy storage device, respectively connected with a second end of the motor winding and the second bus terminal; and a controller, configured to control the bridge arm converter to charge and discharge the battery, so as to realize heating of the battery in a first preset state.

A second aspect of embodiments of the present disclosure provides a battery energy processing method. The battery energy processing method includes: controlling a bridge arm converter to charge and discharge a battery to realize heating of the battery in a first preset state, where a first bus terminal of the bridge arm converter is connected with a positive electrode of the battery; a second bus terminal of the bridge arm converter is connected with a negative electrode of the battery; a first end of a motor winding is connected with a midpoint of the bridge arm converter; and an energy storage device is respectively connected with a second end of the motor winding and the second bus terminal.

A third aspect of the present disclosure provides a vehicle, which includes a battery and the battery energy processing device provided in the above first aspect.

In the above technical solution, a new circuit topology which are connected with the battery including the bridge arm converter, the motor winding, and the energy storage device is designed. Specifically, the energy storage device is respectively connected with the second end of the motor winding and the second bus terminal of the bridge arm converter, and the bridge arm converter is respectively connected with the battery and the motor winding. Based on the circuit topology, the bridge arm converter is controlled in the first preset state to charge and discharge the battery, and internal resistance of the battery causes the battery to generate a large amount of heat, which causes a temperature rise of the battery, thereby realizing the heating of the battery.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

Figure 1:
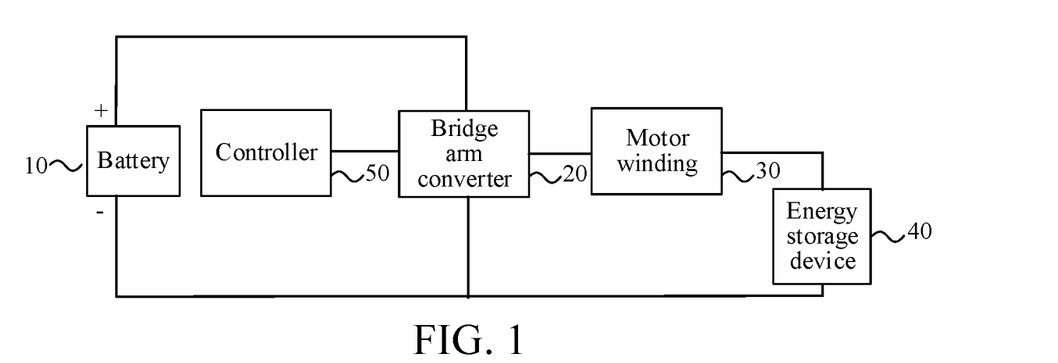
FIG. 1 is a structural block diagram of a battery energy processing device according to an exemplary embodiment of the present disclosure.

As shown in FIG. 1, a battery energy processing device includes: a bridge arm converter 20, having a first bus terminal connected with a positive electrode of a battery 10 and a second bus terminal connected with a negative electrode of the battery 10; a motor winding 30, having a first end connected with a midpoint of the bridge arm converter 20; an energy storage device 40, respectively connected with a second end of the motor winding 30 and the second bus terminal; and a controller 50, configured to control the bridge arm converter 20 to charge and discharge the battery 10, so as to realize heating of the battery 10 in a first preset state.

A new circuit topology which are connected with the battery 10 including the bridge arm converter 20, the motor winding 30, and the energy storage device 40 is designed. Specifically, the energy storage device 40 is respectively connected with the second end of the motor winding 30 and the second bus terminal of the bridge arm converter 20, and the bridge arm converter 20 is respectively connected with the battery 10 and the motor winding 30. Based on the circuit topology, the bridge arm converter 20 is controlled in the first preset state to charge and discharge the battery 10, and internal resistance of the battery 10 causes the battery 10 to generate a large amount of heat, which causes a temperature rise of the battery 10, thereby realizing the heating of the battery 10.

In a specific embodiment, in the first preset state, the controller 50 causes the energy storage device 40 and the battery 10 to charge and discharge.

The battery energy processing device may be configured in a vehicle. In this case, the battery 10 may be a battery configured in a vehicle. Certainly, the battery energy processing device may alternatively be configured in other devices having batteries. This is not limited in the present disclosure.

Figure 2:
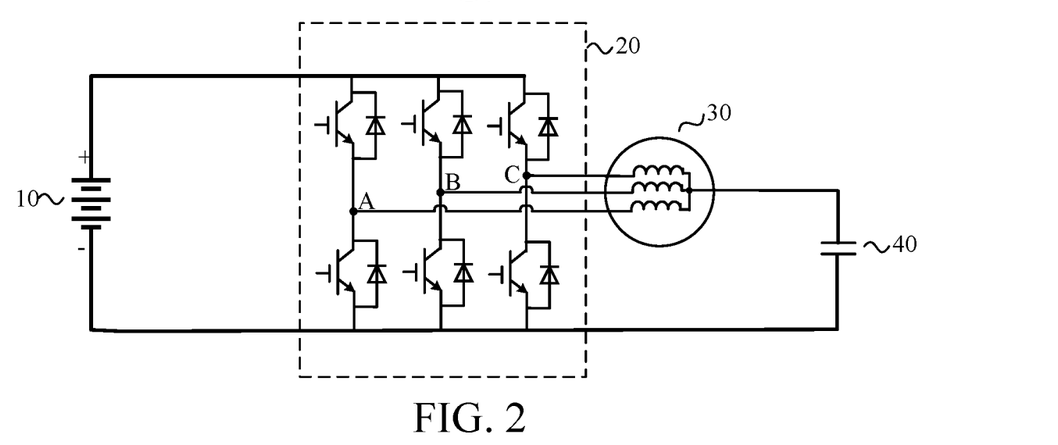
FIG. 2 is a circuit topology diagram of an exemplary embodiment of the battery energy processing device shown in FIG. 1 according to the present disclosure.

In the battery energy processing device provided in the present disclosure, the motor winding 30 may include multi-phase windings, for example, two-phase windings or three-phase windings shown in FIG. 2. Correspondingly, the bridge arm converter 20 may include multi-phase bridge arms, which are in a one-to-one correspondence with the multi-phase windings. As shown in FIG. 2, the motor winding 30 may include a phase A winding, a phase B winding, and a phase C winding. Each phase winding has a respective first end and a second end (in a plane direction shown in FIG. 2, the first end is a left end, and the second end is a right end). The first end of the phase A winding, the first end of the phase B winding, and the first end of the phase C winding form the first end of the motor winding 30 for connecting the midpoint of the bridge arm converter 20. In addition, the second end of the phase A winding, the second end of the phase B winding, and the second end of the phase C winding are connected together to form the second end of the motor winding 30 for connecting the energy storage device 40.

For example, the energy storage device 40 may be a capacitor. The first preset state may be a battery heating state. For example, the user may trigger a vehicle to enter the battery heating state by triggering a battery heating switch according to actual needs. Alternatively, the controller 50 may acquire a signal representing a battery temperature, and determine that the vehicle enters the battery heating state when the battery temperature is less than or equal to a battery temperature threshold. In the first preset state, the controller 50 may control the bridge arm converter 20 to charge and discharge the energy storage device 40 and the battery 10, so as to realize the heating of the battery 10.

In the above technical solution, the energy storage device 40 can store and release energy. In the first preset state, the bridge arm converter 20 may be controlled to control a direction of a current flowing through the motor winding 30 and a voltage across the energy storage device 40. In this way, the charging and discharging between the energy storage device 40 and the battery 10 can be controlled. Due to the internal resistance of the battery, the charging and discharging between the energy storage device 40 and the battery 10 causes the battery to generate a large amount of heat, which causes a temperature rise of the battery, thereby realizing the heating of the battery. In addition, since the motor winding 30 includes multi-phase bridge arms, and the bridge arm converter 20 includes multi-phase bridge arms, in the first preset state, the battery energy processing device provided in the present disclosure can provide a variety of control policies for selection, that is, provide both a possibility of causing one phase winding to be involved in the energy exchange between the energy storage device 40 and the battery 10 and a possibility of causing the multi-phase windings to be involved in the energy exchange between the energy storage device 40 and the battery 10. In this way, the controller 50 may be configured with corresponding policies according to an actual heating demand, to realize different heating efficiency, which further enhances the flexibility and the practicability.

In the present disclosure, the controller 50 controls at least one phase bridge arm of the bridge arm converter 20 in the first preset state, so that the energy storage device 40 and the battery 10 charge and discharge. That is to say, in an embodiment, the controller 50 may control one phase bridge arm of the bridge arm converter 20, such as a phase A bridge arm in FIG. 2, so that a winding corresponding to the phase bridge arm (for example, the phase A winding in FIG. 2) is involved in the energy exchange between the energy storage device 40 and the battery 10, thereby realizing the charging and discharging of the battery 10 and the energy storage device 40. In another embodiment, the controller 50 may control multi-phase bridge arms in the bridge arm converter 20, such as a phase A bridge arm and a phase B bridge arm in FIG. 2, so that windings corresponding to the two-phase bridge arms (for example, the phase A winding and the phase B winding in FIG. 2) are involved in the energy exchange between the energy storage device 40 and the battery 10, thereby realizing the charging and discharging of the battery 10 and the energy storage device 40. During the control of the multi-phase bridge arms of the bridge arm converter 20, upper bridge arms of the controlled multi-phase bridge arms are simultaneously turned on (in this state, lower bridge arms of the multi-phase bridge arms are simultaneously turned off), or the lower bridge arms of the controlled multi-phase bridge arms are simultaneously turned on (in this state, the upper bridge arms of the multi-phase bridge arms are simultaneously turned off). In this way, the multi-phase windings of the motor winding 30 can be involved in the energy exchange between the energy storage device 40 and the battery 10, and the capability to allow a current to pass through can be increased, so that the battery heating rate can be increased, and the battery heating efficiency can be improved.

When a current exists in three-phase windings of the motor, a current vector is formed, and a magnetic field is generated, which causes the motor rotor to output a pulsating torque, thus generating great impact on a life of the motor and the driving safety. In order to prevent the above problem, in the implementations of the present disclosure, the controller 50 may control three-phase bridge arms in the bridge arm converter 20, so that upper bridge arms of the three-phase bridge arms are simultaneously turned on or lower bridge arms of the three-phase bridge arms are simultaneously turned on. The three-phase bridge arms are controlled in a same way, which allows for a current vector of 0 inside the motor, eliminates torque pulsation, and thereby guarantees driving safety and increases the service life of the motor. In addition, the three-phase windings are jointly involved in the energy exchange between the energy storage device 40 and the battery 10, which further increases the capability to allow a current to pass through, and further improves the heating efficiency of the battery.

A process and a principle of controlling the bridge arm converter 20 by the controller to charge and discharge the energy storage device 40 and the battery 10 to realize the heating the battery 10 are described in detail below with reference to FIG. 3 to FIG. 6.

Figure 3:
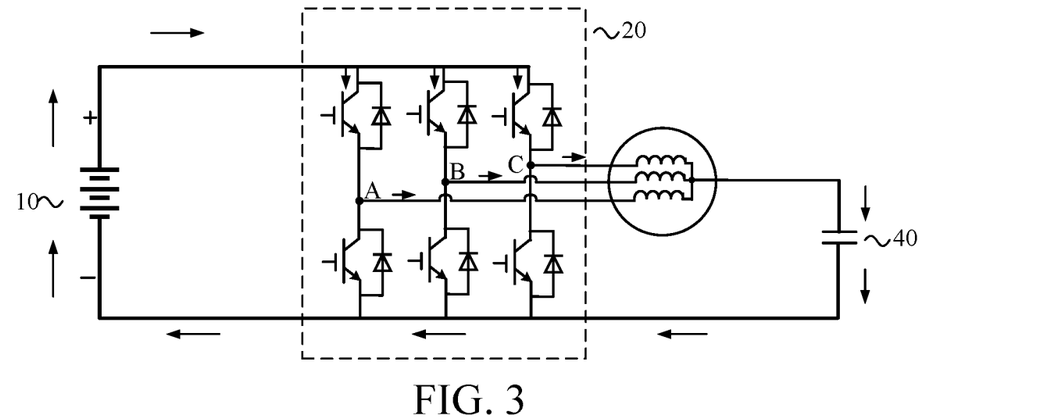
FIG. 3 to FIG. 6 are schematic diagrams of cyclic charging and discharging processes of the battery energy processing device provided in FIG. 2 according to the present disclosure in a first preset state.

Firstly, the controller 50 may control the upper bridge arm of the bridge arm converter 20 to be turned on and the lower bridge arm to be turned off. A current flowing direction in the battery energy processing device at this time is shown in FIG. 3. In the process, the battery 10 is discharged to the outside. As the upper bridge arm turn-on time increases, the voltage across the energy storage device 40 increases continuously to realize energy storage.

Figure 4:
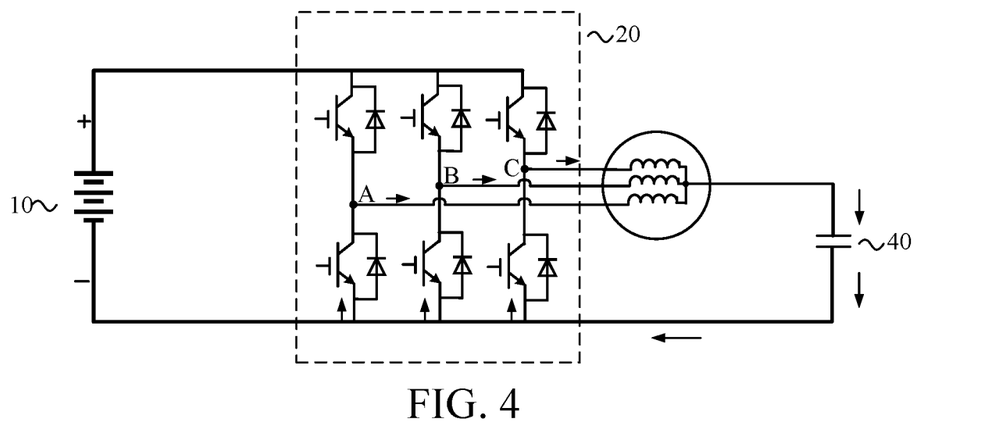

Next, the controller 50 may control the lower bridge arm of the bridge arm converter 20 to be turned on and the upper bridge arm to be turned off. A current flowing direction in the battery energy processing device at this time is shown in FIG. 4. In the process, the voltage across the energy storage device 40 continues to increase. However, the current flowing from the second end of the motor winding gradually decreases.

When the current flowing from the second end of the motor winding drops to zero, the voltage across the energy storage device 40 reaches a maximum value. At this time, the energy storage device 40 automatically transforms from receiving energy from the motor winding 30 to releasing energy to the motor winding 30. The current flowing through the energy storage device 40 begins to reverse compared to the current flow direction as shown in FIG. 4. A current flowing direction in the battery energy processing device at this time is switched to a direction shown in FIG. 5. In the process, the voltage across the energy storage device 40 continuously decreases.

Figure 6:
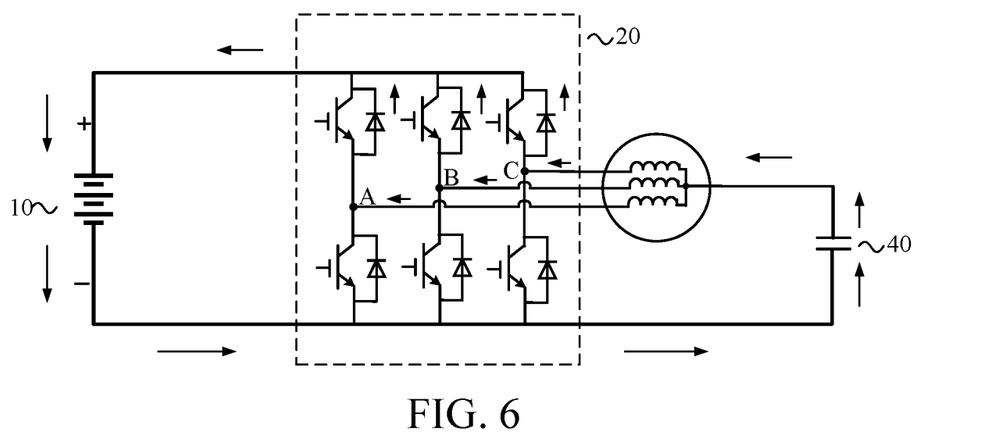

Then, the controller may control the upper bridge arm of the bridge arm converter 20 to be turned on and the lower bridge arm to be turned off. A current flow direction in the battery energy processing device at this time is shown in FIG. 6. In the process, the battery 10 is in a charging state. The energy storage device 40 releases energy, and the voltage across the energy storage device continuously decreases. The current flowing through the energy storage device 40 also gradually decreases.

As the voltage across the energy storage device 40 continuously decreases and the current flowing through the energy storage device 40 continuously decreases, the energy storage device 40 and the motor winding 30 automatically switch from releasing energy to the battery to receiving energy from the battery. The current flowing through the energy storage device 40 begins to reverse compared to the current flow direction as shown in FIG. 6. A current flow direction in the battery energy processing device at this time changes back to the direction shown in FIG. 3, and the battery 10 is discharged to the outside.

The above four processes may be continuously cycled so that cyclic charging and discharging can be quickly performed between the energy storage device 40 and the battery 10. Internal resistance of the battery generates a large amount of heat, which causes a quick temperature rise of the battery, which improves the heating efficiency of the battery. In addition, the three-phase bridge arms are controlled in a same way, which allows for a current vector of 0 inside the motor, eliminates torque pulsation, and thereby guarantees driving safety and increases the service life of the motor.

As shown in the above, in the process shown in FIG. 3, if the control bridge arm converter 20 is controlled to be switched from the state in which the upper bridge arm is on and the lower bridge arm is off to the state in which the upper bridge arm is off and the lower bridge arm is on, a working state of the battery energy processing device is switched to a process shown in FIG. 4. Then, before the energy storage device 40 automatically transforms from receiving energy from the motor winding 30 to releasing energy to the motor winding 30, by turning on the upper bridge arm and turning off the lower bridge arm again, the working state of the battery energy processing device can be switched from the process shown in FIG. 4 to the process shown in FIG. 3 again, thereby realizing cyclic switching between the process shown in FIG. 3 and the process shown in FIG. 4. After the two processes are cycled several times (a number of cycles may be preset), the controller 50 may keep the upper bridge arm off and the lower bridge arm on for a relatively long time in the process shown in FIG. 4, so that the energy storage device 40 can automatically transform from receiving energy from the motor winding 30 to releasing energy to the motor winding 30, thereby completing switching from the process shown in FIG. 4 to a process shown in FIG. 5.

Figure 5:
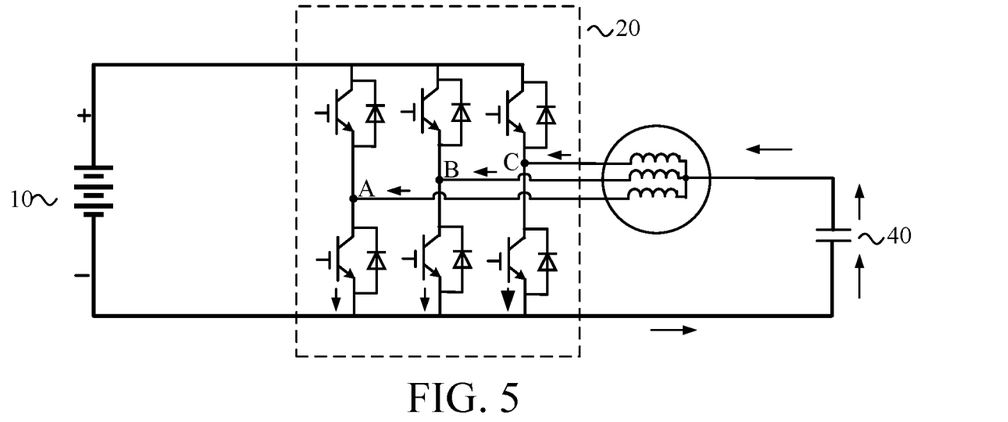

In addition, as shown in the above, in the process shown in FIG. 5, if the control bridge arm converter 20 is controlled to be switched from the state in which the upper bridge arm is off and the lower bridge arm is on to the state in which the upper bridge arm is on and the lower bridge arm is off, the working state of the battery energy processing device is switched to a process shown in FIG. 6. Then, before the energy storage device 40 and the motor winding 30 switches from releasing energy to the battery to receiving energy from the battery, by turning off the upper bridge arm and turning on the lower bridge arm again, the working state of the battery energy processing device is switched from the process shown in FIG. 6 to the process shown in FIG. 5 again, thereby realizing cyclic switching between the process shown in FIG. 5 and the process shown in FIG. 6. After the two processes are cycled several times (a number of cycles may be preset), the controller 50 may keep the upper bridge arm on and the lower bridge arm off for a relatively long time in the process shown in FIG. 6, so that the energy storage device 40 and the motor winding 30 can automatically are switched from releasing energy to the battery to receiving energy from the battery, thereby completing the switching from the process shown in FIG. 6 to the process shown in FIG. 3.

In the present disclosure, the controller 50 may be configured to: in the first preset state, acquire a current flowing through the energy storage device 40 and/or a voltage across the energy storage device 40, and control switching of the on/off of the upper bridge arm and the lower bridge arm of the bridge arm converter 20 according to the current and/or the voltage. In this way, the controller 50 may accurately determine a timing of switching the on/off of the upper bridge arm and the lower bridge arm according to the current flowing through the energy storage device 40 and/or the voltage across the energy storage device 40, so as to realize the switching from the process shown in FIG. 5 to the process shown in FIG. 6 and the switching from the process shown in FIG. 3 to the process shown in FIG. 4, thereby realizing precise control.

Exemplarily, the controller 50 may be configured to control, in the first preset state, the upper bridge arm to be turned off and the lower bridge arm to be turned on when the upper bridge arm is in the turn-on state and the current flowing through the energy storage device 40 reaches to a first current threshold and/or the voltage across the energy storage device 40 increases to a first voltage threshold, for example, the switching from the process shown in FIG. 3 to the process shown in FIG. 4; and the upper bridge arm to be turned on and the lower bridge arm is controlled to be turned off when the lower bridge arm is in the turn-on state and the current flowing through the energy storage device 40 reaches to a second current threshold and/or the voltage across the energy storage device 40 decreases to a second voltage threshold, for example, the switching from the process shown in FIG. 5 to the process shown in FIG. 6.

A current direction corresponding to the first current threshold is opposite to a current direction corresponding to the second current threshold. It is worth noting that the first current threshold, the second current threshold, the first voltage threshold, and the second voltage threshold may be determined according to empirical data, or may be pre-calibrated according to experimental data, or may be determined according to a formula. The formula may represent a correspondence between each threshold and environmental information. When the environmental information changes, the each threshold may be changed accordingly. The environmental information may include, for example, a battery service time, state of charge (SOH) information, a battery temperature, and an ambient temperature. The above formula may be obtained by function fitting by using data in different experimental conditions.

Moreover, when the upper bridge arm is in the turn-on state, the energy storage device 40 and the motor winding 30 are switched from releasing energy to the battery to receiving energy from the battery according to a turn-on time of the upper bridge. For example, the process shown in FIG. 6 switches to the process shown in FIG. 3 is realized.

When the lower bridge arm is in the turn-on state, the energy storage device 40 is switched from receiving energy from the motor winding 30 to releasing energy to the motor winding 30 according to a turn-on time of the lower bridge arm. For example, the process shown in FIG. 4 switches to the process shown in FIG. 5 is realized.

Figure 7:
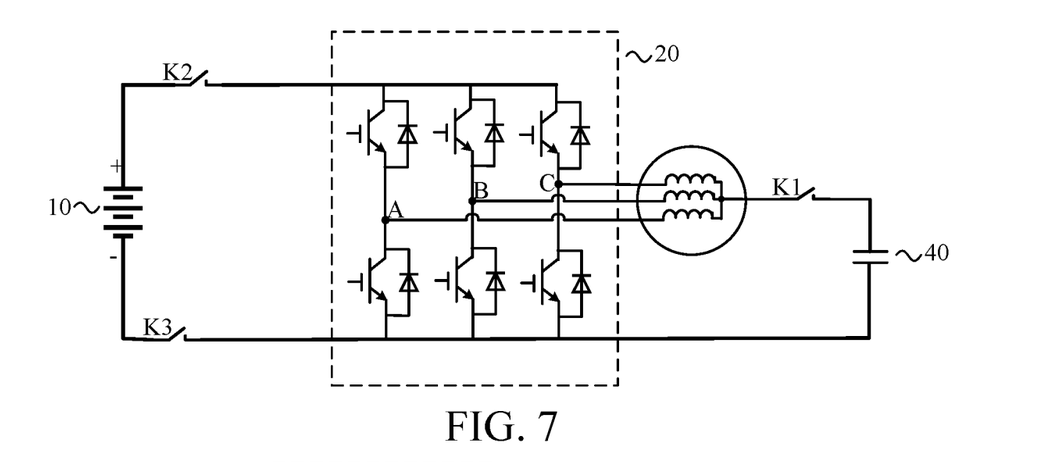
FIG. 7 is a circuit topology diagram of another exemplary embodiment of the battery energy processing device shown in FIG. 2 according to the present disclosure.

As shown in FIG. 7, the battery energy processing device may further include a switch K1 connected in series with the energy storage device 40. The switch K1 is connected between the second end of the motor winding 30 and the second bus terminal of the bridge arm converter 20. The controller 50 may be configured to control, in the first preset state, the first switch K1 to be turned on.

In addition, the battery energy processing device may further include a switch K2 and a switch K3. The switch K2 is connected between the positive electrode of the battery 10 and the first bus terminal of the bridge arm converter 20. The switch K3 is connected between the negative electrode of the battery 10 and the second bus terminal of the bridge arm converter 20. The controller 50 may be configured to control, in the first preset state, the second switch K2 and the third switch K3 to be turned on.

When the heating of the battery is completed, for example, users turn off the battery heating switch or the battery temperature satisfies a temperature threshold condition indicating that the heating of the battery may be stopped, to restore the vehicle to a parking state, the controller 50 may control the bridge arm converter 20 to reduce charging and discharging currents of the battery 10 until the current value becomes zero, control the switches K2 and K3 to be off, and control the bridge arm converter 20 so that the energy storage device 40 is released. After the completion of the release of the energy storage device 40, the controller 50 controls the switch K1 to be off, so that the vehicle is restored to the parking state.

Optionally, the controller 50 may be further configured to: in a second preset state, control the first switch K1 to be turned off, and control the bridge arm converter 20 so that a motor corresponding to the motor winding 30 outputs power. The second preset state is a driving state of the vehicle. In the current driving condition, the switch K1 needs to be kept off, and the controller 50 controls the bridge arm converter 20 so that the motor corresponding to the motor winding 30 outputs power to realize a vehicle driving function. In addition, in the second preset state, the switch K2 and the switch K3 are also kept on.

In this way, the switch K1 can be used as a switch for switching between a battery heating state and the vehicle driving state. The arrangement of the switch K1 realizes the two functions, that is, the battery heating function and the vehicle driving function of the battery energy processing device provided in the present disclosure. By switching the on/off state of the switch K1, the function of the battery energy processing device is controlled, so that the practicability of the battery energy processing device is further improved.

Specifically, in the second preset state, the switch K1 is in the off state, and the bridge arm converter 20 controls the motor through space vector pulse width modulation to drive the motor. When switching from the second preset state to the first preset state, the switch K1 is turned on to enter a battery heating process. The controller 50 controls the bridge arm converter 20 in the manner described above with reference to with FIG. 3 to FIG. 6, so that cyclic charging and discharging can be quickly performed between the energy storage device 40 and the battery 10, thereby completing the battery heating process.

When switching from the first preset state to the second preset state, the controller 50 may control the bridge arm converter 20 to reduce the charging and discharging currents of the battery 10, until the current value becomes zero, and then control the bridge arm converter 20 to complete the release of the energy storage device 40. After the completion of the release of the energy storage device 40, the controller 50 controls the switch K1 to be turned off, so that the hardware circuit of the battery energy processing device is restored to the structure in the vehicle driving state. Then the controller 50 may control the motor through space vector pulse width modulation to drive the motor, so that the vehicle enters a travelling state.

In addition, in an embodiment of the present disclosure, the above motor winding 30 may be a motor winding of the driving motor of the vehicle. Correspondingly, the above bridge arm converter 20 may be a bridge arm converter of the driving motor. That is to say, in the battery energy processing device provided in the present disclosure, the driving motor of the vehicle is reused for battery heating. Since a power of the driving motor is relatively large, a corresponding heating power is relatively large during the heating, so that the heating rate can be increased and the heating efficiency can be improved. In addition, since the existing driving motor on the vehicle is reused, an additional special motor is not required, which can improve the utilization of the devices in the vehicle, reduce the occupation of a vehicle space, reduce the weight of the vehicle, and reduce the costs of the whole vehicle, thereby facilitating the promotion of new energy vehicles.

Optionally, the energy storage device 40 may be a capacitor of a charging circuit of the vehicle. The capacitor is required to satisfy both the charging requirements and the heating requirements. Therefore, the energy storage device 40 also reuses the existing capacitor in the vehicle, so that an additional device is not required to be provided as the energy storage device 40, which can further improve the utilization of the devices in the vehicle, reduce the occupation of the vehicle space, and reduce the costs of the whole vehicle, thereby facilitating the promotion of new energy vehicles.

In addition, reusing the driving motor of the vehicle, the bridge arm converter of the driving motor, and the capacitor of the charging circuit can build the battery energy processing device to realize the heating of the battery. Moreover, only the switch K1 is required to be added to enable both the battery heating function and the vehicle driving function of the battery energy processing device, and the switching between the two states can be flexibly realized through control of the switch K1, which does not require arrangement of different hardware structures. Therefore, the utilization of the devices in the vehicle is improved, the occupation of the vehicle space is reduced, and the costs of the whole vehicle are reduced, thereby facilitating the promotion of new energy vehicles.

Figure 8:
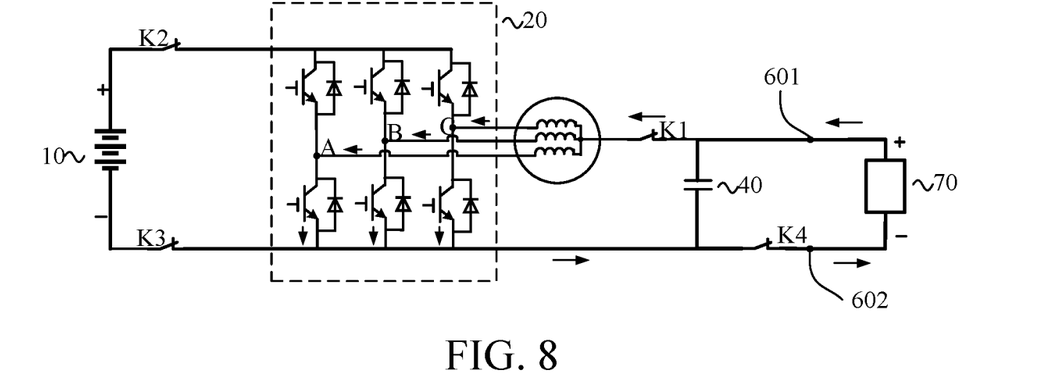
FIG. 8 and FIG. 9 are circuit topology diagrams of a battery energy processing device according to another exemplary embodiment of the present disclosure in a third preset state.
Figure 9:
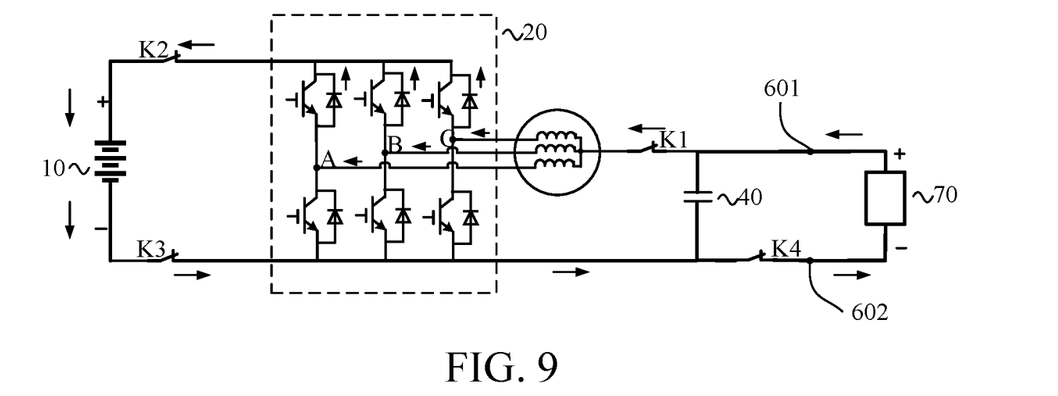
Figure 10:
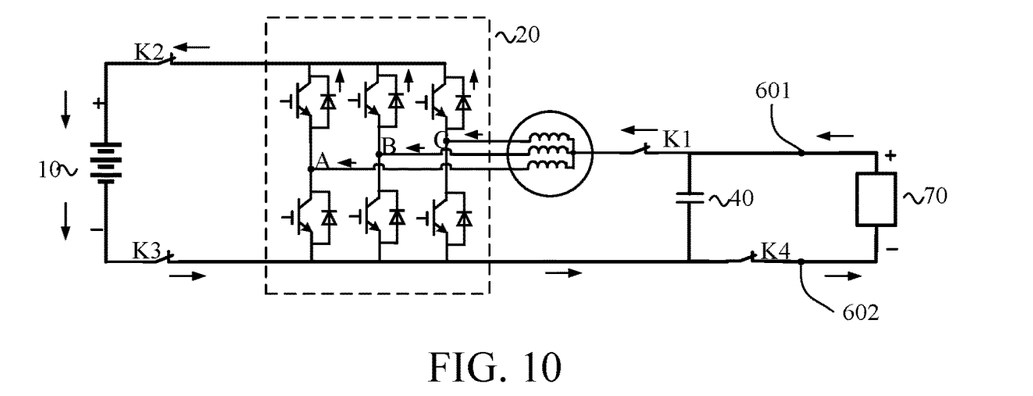
FIG. 10 is a circuit topology diagram of a battery energy processing device according to still another exemplary embodiment of the present disclosure in a third preset state.

As shown in FIG. 8, FIG. 9, and FIG. 10, in the battery energy processing device, two ends of the energy storage device 40 are connected with a first terminal 601 and a second terminal 602 for connecting to an external power supply device 70. The controller 50 may be further configured to control the bridge arm converter 20 in the third preset state, so that the power supply device 70 charges the battery through the battery energy processing device. Specifically, the power supply device 70 may perform boost charging or direct charging the battery through the battery energy processing device or the battery.

Specifically, the battery energy processing device further includes a switch K1 and a switch K4. As shown in FIG. 8 and FIG. 9, the switch K1 is respectively connected with the second end of the motor winding 30 and a first end of the energy storage device 40, the first terminal 601 is respectively connected with the first end of the energy storage device 40 and the switch K1, the switch K4 is respectively connected with a second end of the energy storage device 40 and the second bus terminal of the bridge arm converter 20, and the second terminal 602 is connected with the switch K4. The controller 50 may be configured to: in the third preset state, control the switch K1 and switch K4 to be turned on, and control the bridge arm converter 20, to charge the battery 10 by the power supply device 70.

The battery energy processing device may further include a switch K2 and a switch K3. Therefore, in the third preset state, the controller 50 needs to control the switch K2 and the switch K3 to be turned on.

As shown in FIG. 8 and FIG. 9, the above third preset state is a battery charging state. When the first terminal 601 and the second terminal 602 are connected with the external power supply device 70 (for example, a charging pile), the controller 50 may determine that currently the battery 10 needs to be charged through the power supply device 70. At this time, the controller 50 may control the switches K1, K2, K3, and K4 to be on, and control the on/off of the lower bridge arm of the bridge arm converter 20, so that the power supply device 70 performs the boost charging on the battery 10.

Those of ordinary skill in the art know the following: 1. The upper bridge arm and the lower bridge arm of the bridge arm converter 20 cannot be turned on simultaneously. 2. If one of the upper bridge arm and the lower bridge arm is turned on, the other is turned off. For example, if the upper bridge arm is turned on, the lower bridge arm is turned off, or if the upper bridge arm is turned off, the lower bridge arm is turned on. 3. If one of the upper bridge arm and the lower bridge arm is turned off, the other may be turned off or turned on. For example, if the upper bridge arm is turned off, the lower bridge arm may be turned off or turned on, or if the upper bridge arm is turned off, the upper bridge arm may be turned off or turned on.

For example, as shown in FIG. 8, in the third preset state, the controller 50 may control the lower bridge arm of the bridge arm converter 20 to be turned on and the upper bridge arm of the bridge arm converter to be turned off. At this time, a current flows from a positive electrode of the power supply device 70, passes through the motor winding and the lower bridge arm, and then flows to a negative electrode of the power supply device 70. The current increases continuously. As shown in FIG. 9, the controller 50 may then control the lower bridge arm of the bridge arm converter 20 to be turned off and the upper bridge arm of the bridge arm converter to be turned on or off. At this time, a current flows from the positive electrode of the power supply device 70, passes through the motor winding and the upper bridge arm, and then flows to the positive electrode of the battery to charge the battery. A current from the negative electrode of the battery flows back to the negative electrode of the power supply device 70. It should be noted that, when the upper bridge arm is in the turn-off state, the current flows through a diode of the upper bridge arm. The energy storage function of the motor winding can realize the boost charging of the battery 10 by the power supply device 70.

As shown in FIG. 10, the third preset state above is the battery charging state. When the first terminal 601 and the second terminal 602 are connected with the external power supply device 70, for example, a charging pile, the controller 50 may determine that currently the battery 10 needs to be charged through the power supply device 70. At this time, the controller 50 may control the switches K1, K2, K3, and K4 to be turned on, and control the lower bridge arm of the bridge arm converter 20 to be turned off and the upper bridge arm of the bridge arm converter to be turned on or off. At this time, a current flows from the positive electrode of the power supply device 70, passes through the motor winding and the upper bridge arm, and then flows to the positive electrode of the battery to charge the battery. That is to say, the power supply device 70 directly charges the battery 10. It should be noted that, when the upper bridge arm is in the off state, the current flows through a diode of the upper bridge arm.

The arrangement of the switch K1 and the switch K4 causes the battery energy processing device provided in the present disclosure to provide three different functions, that is, the battery heating function, the vehicle driving function, and the boost charging function based on the same hardware structure. Switching among the three states can be flexibly realized through the control of on/off state of the switches, which does not require arrangement of different hardware structures. Therefore, the utilization of the devices in the vehicle is improved, the occupation of the vehicle space is reduced, and the costs of the whole vehicle are reduced, thereby facilitating the promotion of new energy vehicles.

When switching from the third preset state to the first preset state, after the completion of the charging process, by disconnecting the power supply device 70 from the first terminal 601 and the second terminal 602 of the battery energy processing device through hardware the switching is completed. The switching from the third preset state to the first preset state may alternatively be realized by turning off the switch K4. Then the controller 50 controls the bridge arm converter 20 to quickly perform cyclic charging and discharging between the energy storage device 40 and the battery 10, thereby completing the battery heating process.

When switching from the first preset state to the third preset state, since the voltage across the energy storage device 40 is a variable, the voltage of the energy storage device 40 is required to be regulated to a preset value by controlling the bridge arm converter 20, and then the power supply device 70 is connected to the first terminal 601 and the second terminal 602 of the battery energy processing device to perform boost charging on the battery.

The present disclosure further provides a vehicle, which includes a battery and the battery energy processing device in any of the above embodiments.

The vehicle provided in the present disclosure includes the battery energy processing device in any of the above embodiments, and a new circuit topology connected with the battery 10 including the bridge arm converter 20, the motor winding 30, and the energy storage device 40 is designed. Specifically, the energy storage device 40 is respectively connected with the second end of the motor winding 30 and the second bus terminal of the bridge arm converter 20, and the bridge arm converter 20 is respectively connected with the battery 10 and the motor winding 30. Based on the circuit topology, the bridge arm converter 20 is controlled in the first preset state to charge and discharge the battery 10, and internal resistance of the battery 10 causes the battery 10 to generate a large amount of heat, which causes a temperature rise of the battery 10, thereby realizing the heating of the battery 10.

Figure 11:
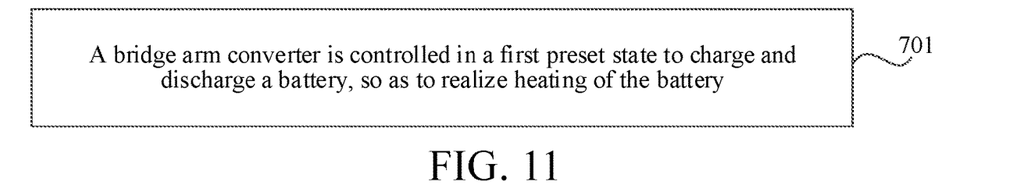
FIG. 11 is a flowchart of a battery energy processing method according to an exemplary embodiment of the present disclosure.

The present disclosure further provides a battery energy processing method. FIG. 11 is a flowchart of a battery energy processing method according to an exemplary embodiment of the present disclosure. As shown in FIG. 11, the method may include the following steps:

S701: A bridge arm converter is controlled in a first preset state to charge and discharge a battery, so as to realize heating of the battery. As shown in FIG. 1, a first bus terminal of the bridge arm converter 20 is connected with a positive electrode of the battery 10, a second bus terminal of the bridge arm converter 20 is connected with a negative electrode of the battery 10, a first end of a motor winding 30 is connected with a midpoint of the bridge arm converter 20, and an energy storage device 40 is respectively connected with a second end of the motor winding 30 and the second bus terminal of the bridge arm converter 20.

A new circuit topology connected with the battery 10 including the bridge arm converter 20, the motor winding 30, and the energy storage device 40 is designed. Specifically, the energy storage device 40 is respectively connected with the second end of the motor winding 30 and the second bus terminal of the bridge arm converter 20, and the bridge arm converter 20 is respectively connected with the battery 10 and the motor winding 30. Based on the circuit topology, the bridge arm converter 20 is controlled in the first preset state to charge and discharge the battery 10, and internal resistance of the battery 10 causes the battery 10 to generate a large amount of heat, which causes a temperature rise of the battery 10, thereby realizing the heating of the battery 10.

In a specific embodiment of the bridge arm converter is controlled in the first preset state to charge and discharge the energy storage device and the battery.

In the above technical solution, the energy storage device can store and release energy. In the first preset state, the bridge arm converter may be controlled to control a direction of a current flowing through the motor winding and a voltage across the energy storage device. In this way, the charging and discharging between the energy storage device and the battery can be controlled. Due to the internal resistance of the battery, the charging and discharging between the energy storage device and the battery causes the battery to generate a large amount of heat, which causes a temperature rise of the battery, thereby realizing the heating of the battery.

In an optional implementation, S701 may further include: controlling the bridge arm converter so that the energy storage device and the battery cyclically charges and discharges to realize the heating of the battery.

During the cyclic charging and discharging between the energy storage device and the battery, the internal resistance of the battery causes the battery to generate a large amount, which causes a quick temperature rise of the battery, which improves the heating efficiency of the battery.

In an optional implementation, S701 may further include: controlling at least one phase bridge arm of the bridge arm converter in the first preset state to charge and discharge the energy storage device and the battery.

In this way, in the first preset state, the battery energy processing method provided in the present disclosure can provide a variety of control policies for selection, that is, provide both a possibility of causing one phase winding to be involved in the energy exchange between the energy storage device and the battery and a possibility of causing the multi-phase windings to be involved in the energy exchange between the energy storage device and the battery. In this way, corresponding policies may be configured according to an actual heating demand, to realize different heating efficiency, which further enhances the flexibility and the practicability.

In an optional implementation, during control of multi-phase bridge arms of the bridge arm converter, upper bridge arms of the multi-phase bridge arms are simultaneously turned on, or lower bridge arms of the multi-phase bridge arms are simultaneously turned on.

In this way, the multi-phase windings in the motor winding can be involved in the energy exchange between the energy storage device and the battery, and the capability to allow a current to pass through can be increased, so that the battery heating rate can be increased, and the heating efficiency of the battery can be improved.

When a current exists in three-phase windings of the motor, a current vector is formed, and a magnetic field is generated, which causes the motor rotor to output a pulsating torque, thus generating great impact on the life of the motor and the driving safety. In order to prevent the above problem, in the implementations of the present disclosure, three-phase bridge arms in the bridge arm converter may be controlled in the above method, so that upper bridge arms of the three-phase bridge arms are simultaneously turned on or lower bridge arms of the three-phase bridge arms are simultaneously turned on. The three-phase bridge arms are controlled in a same way, which allows for a current vector of 0 inside the motor, eliminates torque pulsation, and thereby guarantees driving safety and increases the service life of the motor. In addition, the three-phase windings are jointly involved in the energy exchange between the energy storage device and the battery, so that the capability to allow a current to pass through is further increased, and the heating efficiency of the battery is further improved.

In an optional implementation, the controlling at least one phase bridge arm of the bridge arm converter to charge and discharge the energy storage device and the battery includes: acquiring a current flowing the through the energy storage device and/or a voltage across the energy storage device, and controlling switching of on/off state of an upper bridge arm and a lower bridge arm of the bridge arm converter according to the current and/or the voltage.

In an optional implementation, the controlling switching of on/off state of an upper bridge arm and a lower bridge arm of the bridge arm converter according to the current and/or the voltage includes: controlling the upper bridge arm to be turned off and the lower bridge arm to be turned on when the upper bridge arm is in the turn-on state and the current increases to a first current threshold and/or the voltage increases to a first voltage threshold; and controlling the upper bridge arm to be turned on and the lower bridge arm to be turned off when the lower bridge arm is in the turn-on state and the current reaches a second current threshold and/or the voltage decreases to a second voltage threshold. A current direction corresponding to the first current threshold is opposite to a current direction corresponding to the second current threshold.

In this way, a timing of switching of on/off state of the upper bridge arm and the lower bridge arm may be accurately determined according to the current flowing through the energy storage device and/or the voltage across the energy storage device, thereby realizing precise control.

In an optional implementation, when the upper bridge arm is in the turn-on state, the energy storage device and the motor winding are switched from releasing energy to the battery to receiving energy from the battery according to a turn-on time of the upper bridge arm; and when the lower bridge arm is in the turn-on state, the energy storage device is switched from receiving energy from the motor winding to releasing energy to the motor winding according to a turn-on time of the lower bridge arm.

In an optional implementation, the energy storage device is connected in series with a first switch K1, and the first switch K1 is connected between the second end of the motor winding and the second bus terminal of the bridge arm converter. The method may further include: controlling, in the first preset state, the first switch K1 to be turned on.

In an optional implementation, the method may further include: in a second preset state, controlling the first switch K1 to be turned off, and controlling the bridge arm converter so that a motor corresponding to the motor winding outputs power.

In this way, the first switch K1 can be used as a switch for switching between a battery heating state and a vehicle driving state. The arrangement of the switch K1 realizes the two functions, that is, the battery heating function and the vehicle driving function of the battery energy processing method provided in the present disclosure. By switching the on/off state of the switch K1, different function provided in the battery energy processing method is realized, so that the practicability is further improved.

In an optional implementation, two ends of the energy storage device are connected with a first terminal and a second terminal for connecting to an external power supply device. The method may further include: controlling the bridge arm converter in a third preset state, so that the power supply device charges the battery through the motor winding.

Specifically, the power supply device performs boost charging on the battery through the motor winding. At this time, by periodically switching the on/off state of a lower bridge arm of the bridge arm converter in the third preset state, the power supply device performs the boost charging on the battery; or In another specific embodiment, the power supply device directly charges the battery through the motor winding. At this time, the lower bridge arm of the bridge arm converter is controlled to be turned off in the third preset state, so that the power supply device directly charges the battery.

In this way, the battery energy processing method provided in the present disclosure can provide three different functions, that is, the battery heating function, the vehicle driving function, and the boost charging function based on the same hardware structure. The switching among the three states can be flexibly realized through control on/off state of the switch, which does not require arrangement of different hardware structures. Therefore, the utilization of the devices in the vehicle is improved, the occupation of the vehicle space is reduced, and the costs of the whole vehicle are reduced, thereby facilitating the promotion of new energy vehicles.

For the method in the foregoing embodiments, a specific manner in which steps are already described in detail in the embodiments related to the method, and details are not described herein again.

The specific implementations of the present disclosure are described above in detail with reference to the accompanying drawings, but the present disclosure is not limited to the specific details in the above implementations. Various simple variations may be made to the technical solutions of the present disclosure within the scope of the technical idea of the present disclosure, and such simple variations shall all fall within the protection scope of the present disclosure.

It should be additionally noted that, the specific technical features described in the foregoing specific implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A battery energy processing device, comprising:
   a bridge arm converter, having a first bus terminal connected with a positive electrode of a battery and a second bus terminal connected with a negative electrode of the battery;
   a motor winding, having a first end connected with a midpoint of the bridge arm converter;
   an energy storage device, connected with a second end of the motor winding and the second bus terminal of the bridge arm converter; and
   a controller, configured to control, in a first preset state, the bridge arm converter to charge and discharge the battery through the energy storage device to heat the battery.

2. The battery energy processing device according to claim 1, wherein the controller controls at least one phase bridge arm of the bridge arm converter in the first preset state, so that the energy storage device charges and discharges the battery.

3. The battery energy processing device according to claim 2, wherein during control of multi-phase bridge arms of the bridge arm converter, upper bridge arms of the multi-phase bridge arms are simultaneously on; or lower bridge arms of the multi-phase bridge arms are simultaneously on.

4. The battery energy processing device according to claim 3, wherein the controller is configured to: in the first preset state, acquire a current flowing through the energy storage device and/or a voltage across the energy storage device, and control switching of on/off state of the upper bridge arms and the lower bridge arms of the bridge arm converter according to the current and/or the voltage.

5. The battery energy processing device according to claim 4, wherein the controller is configured to: in the first preset state,
control the upper bridge arms to be turned off and the lower bridge arms to be turned on when the upper bridge arms are in the on state and the current increases to a first current threshold and/or the voltage increases to a first voltage threshold; and
control the upper bridge arms to be turned on and the lower bridge arms to be turned off when the lower bridge arms are in a turn-on state and the current reaches a second current threshold and/or the voltage decreases to a second voltage threshold, wherein
a current direction corresponding to the first current threshold is opposite to a current direction corresponding to the second current threshold.

6. The battery energy processing device according to claim 5, wherein
when the upper bridge arms are in the turn-on state, the energy storage device and the motor winding are switched from releasing energy to the battery to receiving energy from the battery according to a turn-on time of the upper bridge arms; and
when the lower bridge arms are in the turn-on state, the energy storage device is switched from receiving energy from the motor winding to releasing energy to the motor winding according to a turn-on time of the lower bridge arms.

7. The battery energy processing device according to claim 1, further comprising a first switch connected in series with the energy storage device, wherein
the first switch is connected between the second end of the motor winding and the second bus terminal; and
the controller is configured to control, in the first preset state, the first switch to be turned on.

8. The battery energy processing device according to claim 7, wherein the controller is further configured to: in a second preset state, control the first switch to be turned off, and control the bridge arm converter so that a motor corresponding to the motor winding outputs power.

9. The battery energy processing device according to claim 3, wherein two ends of the energy storage device are connected with a first terminal and a second terminal for connecting to an external power supply device; and the controller is further configured to: in a third preset state, control the bridge arm converter, so that the external power supply device charges the battery through the battery energy processing device.

10. The battery energy processing device according to claim 9, further comprising a first switch and a second switch, wherein the first switch is connected with the second end of the motor winding and the energy storage device; the first terminal is connected with the energy storage device and the first switch; the second switch is connected with the energy storage device and the second bus terminal; the second terminal is connected with the second switch; and
the controller is configured to: in the third preset state, control the first switch and the second switch to be turned-on, and control the bridge arm converter so that the external power supply device charges the battery.

11. The battery energy processing device according to claim 10, wherein the controller is configured to: in the third preset state, control the first switch and the second switch to be turned-on, and control the lower bridge arms of the bridge arm converter to be on and off periodically, so that the external power supply device performs boost charging on the battery; or
the controller is configured to: in the third preset state, control the first switch and the second switch to be turned-on, and control the lower bridge arms of the bridge arm converter to be turned-off, so that the power supply device directly charges the battery.

12. The battery energy processing device according to claim 1, wherein the controller is configured to: in the first preset state, control the bridge arm converter so that the energy storage device and the battery cyclically charges and discharges to realize heating of the battery.

13. A battery energy processing method, comprising:
controlling, in a first preset state, a bridge arm converter to charge and discharge a battery through an energy storage device to realize heating of the battery, wherein a first bus terminal of the bridge arm converter is connected with a positive electrode of the battery; a second bus terminal of the bridge arm converter is connected with a negative electrode of the battery; a first end of a motor winding is connected with a midpoint of the bridge arm converter; and the energy storage device is connected with a second end of the motor winding and the second bus terminal of the bridge arm converter.

14. The method according to claim 13, wherein the controlling, in a first preset state, a bridge arm converter to charge and discharge a battery to realize heating of the battery comprises: controlling the bridge arm converter in the first preset state to charge and discharge the energy storage device and the battery.

15. The method according to claim 14, wherein the controlling the bridge arm converter in the first preset state to charge and discharge the energy storage device and the battery comprises:
controlling at least one phase bridge arm of the bridge arm converter in the first preset state, to charge and discharge the energy storage device and the battery, comprising: in the first preset state, acquiring a current flowing through the energy storage device and/or a voltage across the energy storage device, and controlling switching of on/off state of an upper bridge arm and a lower bridge arm of the bridge arm converter based on the current and/or the voltage, wherein
during control of multi-phase bridge arms of the bridge arm converter, upper bridge arms of the multi-phase bridge arms are simultaneously turned on; or lower bridge arms of the multi-phase bridge arms are simultaneously turned on.

16. The method according to claim 15, wherein the controlling switching of on/off state of an upper bridge arm and a lower bridge arm of the bridge arm converter based on the current and/or the voltage comprises:

controlling the upper bridge arm to be turned off and the lower bridge arm to be turned on when the upper bridge arm is in a turn-on state and the current increases to a first current threshold and/or the voltage increases to a first voltage threshold; and controlling the upper bridge arm to be turned on and the lower bridge arm to be turned off when the lower bridge arm is in the turn-on state and the current reaches a second current threshold and/or the voltage decreases to a second voltage threshold, wherein a current direction corresponding to the first current threshold is opposite to a current direction corresponding to the second current threshold;

when the upper bridge arm is in the turn-on state, the energy storage device and the motor winding are switched from releasing energy to the battery to receiving energy from the battery according to a turn-on time of the upper bridge arm; and when the lower bridge arm is in the turn-on state, the energy storage device is switched from receiving energy from the motor winding to releasing energy to the motor winding according to a turn-on time of the lower bridge arm.

17. The method according to claim 13, wherein the energy storage device is connected in series with a first switch; the first switch is connected between the second end of the motor winding and the second bus terminal; and the method further comprises: controlling, in the first preset state, the first switch to be turned on; and in a second preset state, controlling the first switch to be turned on, and controlling the bridge arm converter so that a motor corresponding to the motor winding outputs power.

18. The method according to claim 13, wherein both ends of the energy storage device are connected with a first terminal and a second terminal for connecting to an external power supply device; and the method further comprises: controlling, in a third preset state, the bridge arm converter so that the external power supply device charges the battery through the motor winding; and the charging of the battery by the external power supply device through the motor winding comprises: performing, by the external power supply device, boost charging on the battery through the motor winding, wherein a lower bridge arm of the bridge arm converter is periodically controlled to be on and off in the third preset state, so that the external power supply device performs the boost charging on the battery; or the charging of the battery by the external power supply device through the motor winding comprises: directly charging, by the external power supply device, the battery through the motor winding, wherein the lower bridge arm of the bridge arm converter is controlled to be off in the third preset state, so that the power supply device directly charges the battery.

19. The method according to claim 13, wherein the controlling the bridge arm converter to charge and discharge the energy storage device and the battery to realize heating of the battery comprises:

controlling the bridge arm converter to cyclically charge and discharge the energy storage device to realize the heating of the battery.

20. A vehicle, comprising a battery and a battery energy processing device, wherein the battery energy processing device comprises:

a bridge arm converter, having a first bus terminal connected with a positive electrode of a battery and a second bus terminal connected with a negative electrode of the battery;

a motor winding, having a first end connected with a midpoint of the bridge arm converter;

an energy storage device, connected with a second end of the motor winding and the second bus terminal of the bridge arm converter; and a controller, configured to control, in a first preset state, the bridge arm converter to charge and discharge the battery through the energy storage device to heat the battery.

* * * * *